United States Patent [19]

Dey et al.

[11] 4,356,240

[45] Oct. 26, 1982

[54] EXTREMELY HIGH RATE FLAT CELL

[75] Inventors: Arabinda N. Dey, Needham; Noble E. Hamilton, Middleton, both of Mass.

[73] Assignee: Duracell Inc., Bethel, Conn.

[21] Appl. No.: 200,819

[22] Filed: Oct. 27, 1980

[51] Int. Cl.³ .............................................. H01M 4/36
[52] U.S. Cl. ................................. 429/101; 429/128; 429/155; 429/196
[58] Field of Search ............................ 29/623.1, 623.2; 429/128, 152–155, 161, 162, 101, 196, 105

[56] References Cited

U.S. PATENT DOCUMENTS

| | | | |
|---|---|---|---|
| 3,369,937 | 2/1968 | Himy | 429/161 |
| 3,393,095 | 7/1968 | Philipp | 136/14 |
| 3,761,314 | 9/1973 | Cailley | 136/13 |
| 4,169,920 | 10/1979 | Epstein | 429/154 |
| 4,284,691 | 8/1981 | Goebel et al. | 429/128 X |

*Primary Examiner*—Charles F. LeFevour
*Attorney, Agent, or Firm*—Ronald S. Cornell; Israel Nissenbaum

[57] ABSTRACT

An extremely high rate flat cell and a method of fabrication thereof with the cell comprising successive stacked anode and cathode layers within a cell container comprised of two members with co-fitting external flanges. Each cathode layer embodies a metallic extension or tab therefrom for external terminal connection. The extensions of all the cathode layers are substantially symmetrically positioned between said co-fitting external flanges with said flanges and metallic extensions all being simultaneously welded together and electrically interconnected during cell sealing. The anode layers are electrically connected together, preferably by pressure contacting layers to each other adjacent to a metallic terminal member for said anode. Such a cell having a lithium anode, a carbon cathode and a thionyl chloride electrolyte solvent/cathode depolarizer (3" diameter×0.90" height) safely provides a short circuit current in excess of 1500 amperes at a voltage above 1 volt and about 14 ampere hours at a constant current of 100 amperes.

7 Claims, 4 Drawing Figures

U.S. Patent    Oct. 26, 1982    4,356,240
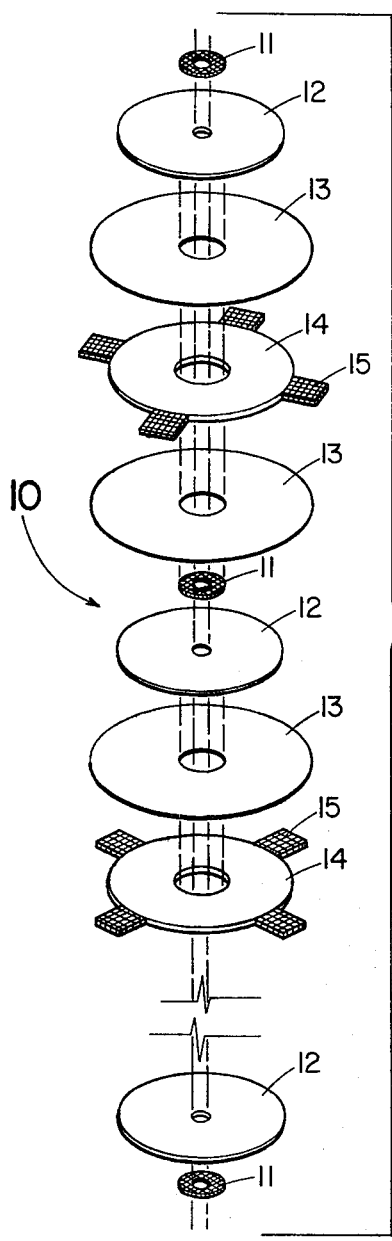
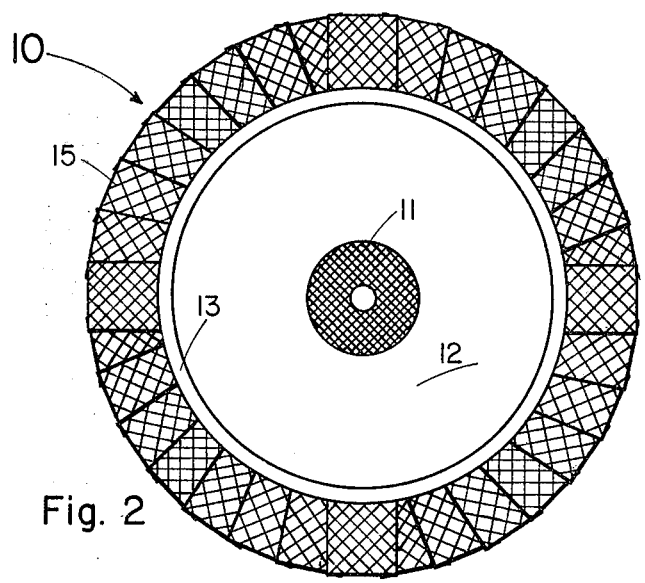
Fig. 2
Fig. 1
Fig. 4
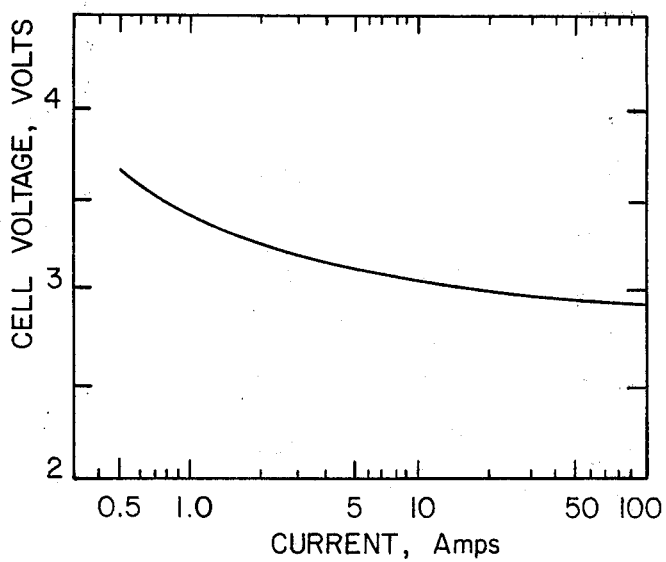
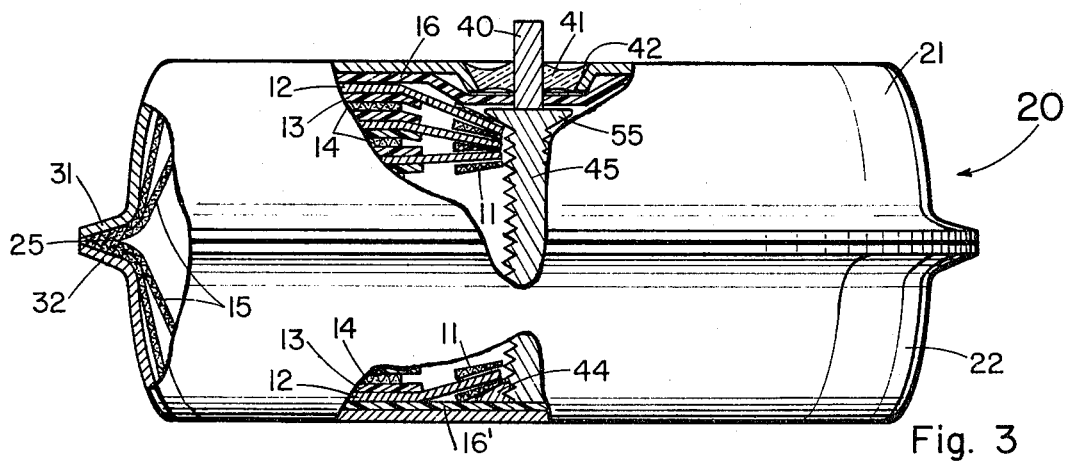
Fig. 3

EXTREMELY HIGH RATE FLAT CELL

The invention herein described was made in the course of or under a contract with the Department of the Army.

This invention relates to high rate cell structures and methods of fabrication and particularly to cell structures for high rate Li/SOCl$_2$ cells.

High rate electrochemical cells generally require large surface area electrodes and relatively short interelectrode distances. This has usually been accomplished by utilizing either very long and thin convolute wound electrode structures or by stacking layers of thin electrode materials in prismatic or flat cell configurations with the electrode materials of like polarity being electrically interconnected. Typically the electrical connection between the electrodes of like polarity is accomplished by gathering protruding metallic tabs from the electrode layers and connecting them into a single unit which is thereafter electrically connected to the terminal for that electrode. In order to provide integrity for the electrical connections the tabs are usually welded to each other or to a common metallic member generally in a laborious and time consuming individual manner.

It is an object of the present invention to provide a method for individually welding electrode tabs to the electrode terminal in a single step during the hermetic sealing of an electrochemical cell.

It is a further object of the present invention to provide a method whereby numerous metallic anode layers within an electrochemical cell may be compressingly formed into a single electrical anode unit.

It is a still further object of the present invention to provide a cell constructed with electrical interelectrode component connections, as above, which cell is thereby capable of being discharged at extremely high rates.

These and other objects, features and advantages of the present invention will become more evident from the following discussion as well as the drawing in which:

FIG. 1 is an exploded view of an electrode stack made in accordance with the present invention for use in an extremely high rate electrochemical cell;

FIG. 2 is a plan view of said electrode stack;

FIG. 3 is a partially sectioned elevation view of an electrochemical cell containing the electrode stack of FIGS. 1 and 2 (with parts omitted or exaggerated for clarity); and FIG. 4 is a polarization curve of a cell made in accordance with the present invention.

The present invention generally comprises a method for constructing an extremely high rate electrochemical cell containing numerous thin anode and cathode layers which are electrically interconnected respectively into single electrical units of an anode and a cathode. The high surface area of both the anode and cathode (resulting from the numerous thin electrode layers) permits the high rate utilization of the cell by minimizing internal cell impedance. Each of the cathode layers has at least one protruding conductive projection such as a metallic tab (preferably integral with the commonly used metallic cathode substrate) which extends beyond the periphery of the electrode layers. The tabs are preferably substantially symmetrically of uniformly spaced around said periphery and positioned between two cell container components at the site at which such cell components are welded to each other for hermetic closure of the cell. The cell is simultaneously hermetically sealed and all of the cathode layers are electrically interconnected, with all of the cathode tabs also being welded and electrically connected to the cell container during the sealing procedure. The external cell container thereafter functions as the cathode or positive terminal for external electrical connection.

In a preferred embodiment all the electrode layers and the separators therebetween have coincident central apertures whereby when an electrode stack is formed, a threaded metallic bolt may be passed therethrough. In order to facilitate interanode layer pressure contacting the apertures in the anode metal layers and the bolt head are of smaller diameters than those of the cathode and separator layers and the bolt head is larger than the anode metal layer apertures. Accordingly, with anode metal layers at both ends of the electrode stack, the bolt, when threaded with a corresponding nut, will anchor the entire electrode stack by compressingly engaging and electrically connecting all the anode layers. The metallic bolt thereby also functions as the current collector for the anode. In order to further insure positive electrical connection between the anode layers and the metallic bolt, the anode metal layers are interleaved with expanded metal washers around the periphery of the apertures in the anode metal layers. The expanded metal washers are similarly compressed and bitingly securely engage the anode layers when the bolt is threaded with the nut.

With specific reference to the drawings, FIG. 1 depicts a preferred embodiment of an electrode stack 10 made in accordance with the present invention for use in an electrochemical cell. The stack 10 comprises repeated units which comprise successive layers of expanded metal washer 11, metallic anode 12, separator 13, cathode 14, and separator 13 which units are repeated as desired. Cathode layers 14, as shown, each embody four symmetrically disposed (90° apart) extending expanded metal tabs 15. Successive cathode layers 14 in the electrode stack 10 are slighty offset from each other by indexing means whereby substantially all of the terminal tabs 15 of all the cathode layers 14 are uniformly and symmetrically disposed around the periphery of the electrode stack and extending therefrom as shown in FIG. 2. After the electrode layers, together with washers and separators, are assembled into a stack they are placed within a metallic cell container 20 as shown in FIG. 3 wherein the extending cathode tabs 15 are positioned between opposing external peripheral flanges 31 and 32 of co-fitting dish shaped container components 21 and 22 respectively. Flanges 31 and 32 are welded together by a circular weld with the expanded metal tabs 15 being coalesced into a solid metal bead 25 which forms part of the hermetic cell seal. Said bead provides a positive and substantially uniformly distributed electrical connection between all of the cathode layers and the terminal therefor, i.e., the metallic cell container 20. The uniform and symmetrical distribution of the electrical connection additionally serves to dissipate heat generation from the cell generated during cell discharge at high rates without the formation of localized detrimental hot spots.

The electrical interconnection of the anode layers 12 is preferably accomplished (prior to sealing of the cell) by the steps of placing threaded bolt 45 with head 55 through the central apertures in the electrode stack 10 into threaded engagement with nut 44. By threading nut 44 onto bolt 45, the inner periphery of anode layers 12 are compressed together with the interleaved expanded metal washers 11 for secure electrical interconnection between the anode layers 12. The anode layers 12 are also thereby electrically connected to bolt 45 for external electrical connection. For such external electrical connection, bolt 45 is further electrically connected to metal member 40 which extends beyond the cell as the negative terminal. Metal member 40 also forms part of a glass metal seal whereby it is insulated from the body of the cell container by glass member 41 which is in turn sealed to internal circular flange 42 of cell container component 21. In order to prevent internal short circuiting, insulating layers of container linings 16 and 16' insulate the anode metal end layers from electrically contacting the top and bottom walls of the metal cell container 20. Layers 16 and 16' also externally overlap the first and last anode layers thereby also insulating them from the side walls of the cell. Similarly, separator layers 14 have a larger diameter than the anode metal layers and therefore overlap the external edges of the anode metal internal layers whereby they are also insulated from electrical contact with the side walls of the cell container. The diameter of the aperture in the cathode layers 14 is larger than that of the separator layers 13 such that a portion of the separator layers 13 overlap the inner periphery of the cathode layers 14 thereby insulating them from the compressed anode layers 12. The diameters of the apertures in both the expanded metal washers 11 and the anode metal layers 12 are larger than that of the bolt 45 but smaller than that of the bolt head 55 and nut 44 whereby metal washers 11 and anode layers 12 may be compressed therebetween.

In order to assure uniformity and as well as to reduce cost and complication in fabrication, the cell electrodes are preferably stamped out with a die. The cathode layers which generally comprise compressed powder on an expanded metal substrate are stamped out with extensions from the main body of the layer. The compressed powder is thereafter removed from the extensions leaving the expanded metal of the substrate to function as the metal extension or tab as required in the present invention. By utilizing the substrate as the metal tab, integrity of electrical connection to the body of the cathode layers is enhanced and there is no need for additional steps of, for example, welding tabs to each individual cathode layer.

High rate utility of the cells of the present invention is enhanced with the utilization of active electrode materials which provide the greatest energy density and voltages. Additionally, the use of fluid cathode depolarizers further enhances high rate utilization since such materials are relatively mobile and can be reacted (during cell discharge) at more rapid rates. The active anode materials of choice are the active metals particularly the alkali metals and most particularly lithium. Fluid cathode depolarizers which are most commonly utilized in electrochemical cells include thionyl chloride ($SOCl_2$) and sulfur dioxide ($SO_2$) with thionyl chloride being preferred for the high rate cells of the present invention because of its higher potential relative to a lithium anode and greater energy density. However, the use of fluid cathode depolarizers generally and in fact even solid cathode depolarizers is within the ambit of the present invention.

In cells containing fluid cathode depolarizers such as the aforementioned thionyl chloride, the cathode structure comprises an inert cathode carbonaceous material such as compressed carbon or graphite powder on an expanded metal substrate, with the cell reaction occurring in the inert cathode. With solid cathode depolarizers such as for example manganese dioxide, the solid active material itself is placed on the expanded metal substrate.

In order to illustrate the high rate discharge capability of cells made in accordance with the present invention, the following examples are presented. It is understood, however, that such examples are for illustrative purposes only and that any specific enumeration of detail should not be construed as limitations on the present invention. Unless otherwise indicated, all parts are parts by weight.

EXAMPLE 1

A flat cell having the configuration shown in FIG. 3 is constructed with 41 lithium foil anode layers (each with 0.005" (0.13 cm) thickness, 2.55" (6.5 cm) diameter and 0.25" (0.63 cm) diameter central aperture); 40 cathode layers of 90:10 carbon:polytetrafluoroethylene mixture on expanded metal grid (each cathode with 0.012" (0.03 cm) thickness, 2.70" (6.9 cm) diameter and 0.75" (1.9 cm) diameter central aperture) with each layer having four 0.5" (1.27 cm) square expanded metal tabs with the carbon mixture having been arranged off; glass filter paper separators (each with 0.005" (0.13 cm) thickness, 2.70" (6.9 cm) diameter and 0.28" (0.71 cm) diameter central aperture) therebetween; and expanded nickel washers (each with 0.011" (0.028 cm) thickness, 0.403" (1.02 cm) diameter with 0.205" (0.052 cm) diameter central aperture) adjacent each of the anode layers (FIG. 1). The successively stacked cathode layers are offset slightly from each other whereby the metal tabs are substantially uniformly distributed around the periphery of the electrode stack (FIGS. 1 and 2). The electrode stack is thereafter mechanically held by a metal bolt which passes through the central apertures. The bolt head, (larger than the apertures in the nickel washers and anode metal layers) together with a nut threaded on the end of the bolt compress the electrode stack therebetween with the lithium anode layers being electrically interconnected thereby. The bolt is centrally fastened to a dish-shaped stainless steel container member 21 (FIG. 3) inside diameter of 2.73" (6.93 cm), 0.45" (1.2 cm) height with a 0.27" (0.69 cm) wide external flange. A second dish-shaped stainless steel container member 23 with similar dimensions and cofitting external flange is placed on the first container member to enclose the electrode stack therewithin. The substantially uniformly distributed cathode metal tabs are positioned between the cofitting metal flanges of the container members with portions thereof extending beyond the flanges being trimmed off. The cell is filled with a fluid cathode depolarizer/electrolyte solution of 1.8 M $LiAlCl_4$ in $SOCl_2$ (about 75 grams). The cell is hermetically sealed and the cathode layers are simultaneously electrically interconnected by a circular resistance weld of the metal flanges, with the cathode metal tab members therebetween being coalesced into a solid metal mass which forms part of the hermetic seal of the cell. The cell is thereafter placed on a discharge regimen of 17.5 A for 35.5 m.sec. followed by 1.8 A for 14.5 m.sec. The cycle continues for 3 minutes which then constitutes one "burst" and the three minute cycle occurs every 30 minutes at room temperature (25° C.). The cell delivers 18 bursts at which point the cell voltage at 17.5 A is above 3 volts. During the testing cycle on increasing the load from 1.8 A to 17.5 A the cell voltage drops from 3.4 V to 3.35 V, a polarization of only 50 mV. The maximum temperature of the cell during the discharge is less than 29° C.

EXAMPLE 2

A cell is constructed in accordance with the procedure and structure described in Example 1 but with 36 cathodes and 37 anodes. The cell is tested by discharging it at 20 A for 0.029 sec. followed by a 3.2 A discharge for 0.021 sec. and repeated for 20 seconds which constitutes a burst. The bursts are repeated every three minutes. On this regimen at room temperature (25° C.) the cell provides 290 bursts (20.3 Ahr.). The cell voltage on the 20 A load is near 3.2 volts for most of the discharge and only reaches 2.5 volts at the 290th burst. The cell temperature remains below 30° C. during the entire discharge.

EXAMPLE 3

A cell made in accordance with Example 2 is polarized by high currents. The current-voltage curve is shown in FIG. 4. At 50 amperes current the cell voltage remains at about 2.95 volts.

EXAMPLE 4

A cell made in accordance with Example 2 is soaked for 6 hours at 0° C. prior to testing as in Example 2 but at 0° C. The average cell voltage on 3.2 A load is 3.2 volts and on 20 A load is 2.75 volts. The cell delivers 11.4 Ahr to 2.5 volts and 14 Ahr to 2.0 volts. The cell wall temperature reaches 10° C. at the end of the test. The cell delivers about 70% of the room temperature capacity of 20 Ahr to a 2.0 volt cutoff.

EXAMPLE 5

A cell is made and tested in accordance with Example 4 but is soaked for three days at −30° C. prior to discharge at −30° C. The cell delivers about 7.1 Ahr to 2.5 volts and 9.9 Ahr to 2.0 volt cutoffs respectively (about 50% of room temperature capacity to the 2.0 volt cutoff).

EXAMPLE 6

The cell of Example 2, after discharge, is force discharged at a constant current of 3 A to voltage reversal for a period of 20 hours. The cell temperature rises to 38° C. and then becomes constant. The cell voltage clamps itself at zero volts within one hour of reversal and remains there for the remainder of the 20 hours.

EXAMPLE 7

A cell made in accordance with Example 2 is short circuited for 0.12 seconds. The cell delivers short circuit currents in excess of 1500 A at a cell voltage of 1.0 volt. The internal impedance of the cell is about 1.7 milliohm. The short circuit characteristics correspond to a power density in excess of 2.7 KW/lb or 0.21 KW/in$^3$. The cell is capable of delivering the short circuit pulses every half hour without significant cell heating or venting.

EXAMPLE 8

A cell made in accordance with Example 2 is discharged at a constant 20 A current. A cell provides 13 Ahr to a 3.0 volt cutoff and 19.8 Ahr to a 2.0 volt cutoff.

EXAMPLE 9

A cell made in accordance with Example 2 is discharged on a continuous 100 A current. The cell runs for 8.5 minutes to a voltage of 2.7 volts corresponding to a capacity of 13.6 Ahr.

The characteristics of the cells in Examples 8 and 9 are summarized in the following Table:

TABLE

| Current Drain | Operating Voltage | Power (W) | Power Density (W/in$^3$) | Capacity (A.hr) | Total Energy (WHr) | Energy Density (Whr/in$^3$) |
| --- | --- | --- | --- | --- | --- | --- |
| 20A | 3.2 | 64 | 10 | 19.8 | 59 | 9 |
| 100A | 3.0 | 100 | 47 | 13.6 | 41 | 6 |

The above examples illustrate the extremely high rate performance of cells, made in accordance with the present invention, under varying conditions. Additionally, such examples further illustrate the safety of such cells under various abusive conditions. It is understood however that the examples are only illustrative of the present invention with changes in cell structure and components such as interchanging anode and cathode being possible without departing from the scope of the present invention as defined in the following claims.

What is claimed is:

1. An electrochemical cell comprising multiple layers of anode and cathode electrode materials contained in a cell container wherein all of the layers of one of said anode and cathode electrode materials embody conductive projections therefrom which are positioned between elements of said cell container which are hermetically sealed to seal said cell, with said conductive projections being electrically interconnected with said elements and which conductive projections form part of the seal of said cell.

2. The cell of claim 1 wherein said conductive projections are embodied in said cathode layers.

3. The cell of claim 2 wherein said cell container is comprised of two dish-shaped members with cofitting external peripheral flanges which comprise said elements.

4. The cell of claim 3 wherein said conductive projections are substantially uniformly distributed between said flanges.

5. The cell of claim 4 wherein said anode layers are comprised of lithium.

6. The cell of claim 5 wherein said cell contains a fluid cathode depolarizer.

7. The cell of claim 6 wherein said fluid cathode depolarizer is comprised of thionyl chloride.

* * * * *